J. H. WAGENHORST.
VEHICLE WHEEL RIM.
APPLICATION FILED AUG. 14, 1912.
1,085,773.
Patented Feb. 3, 1914.
2 SHEETS—SHEET 1.
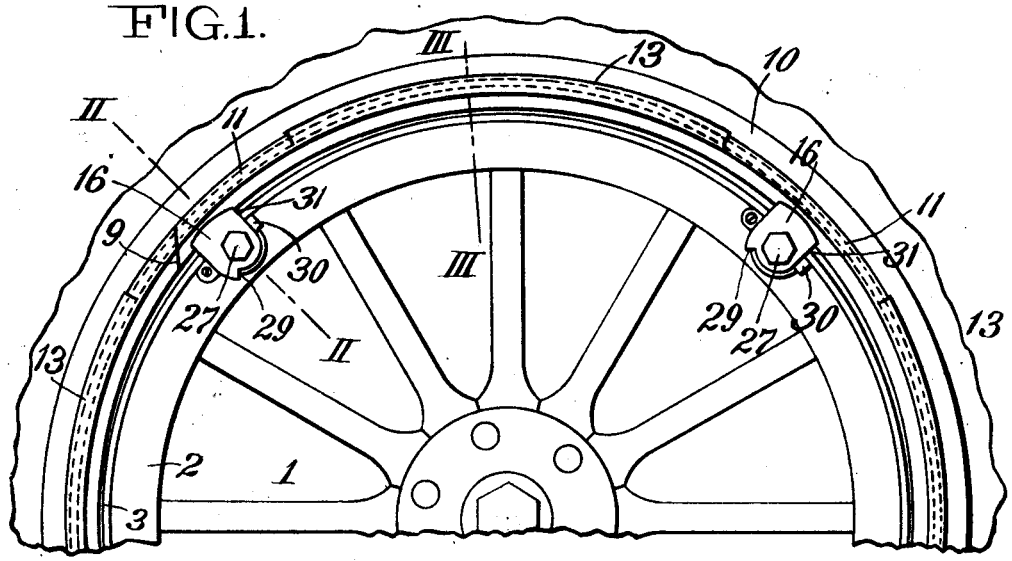
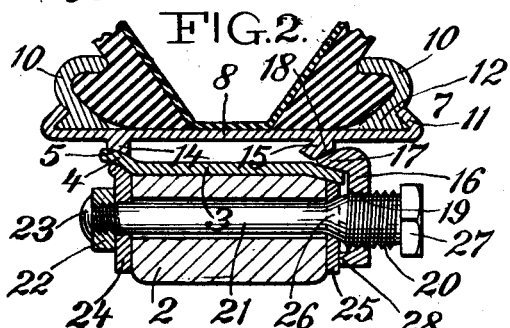
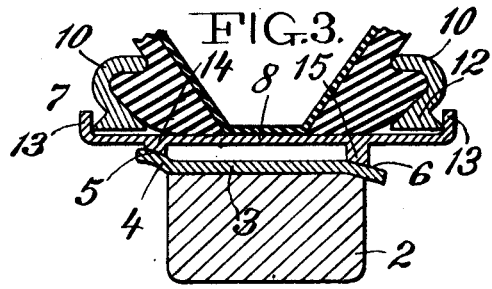
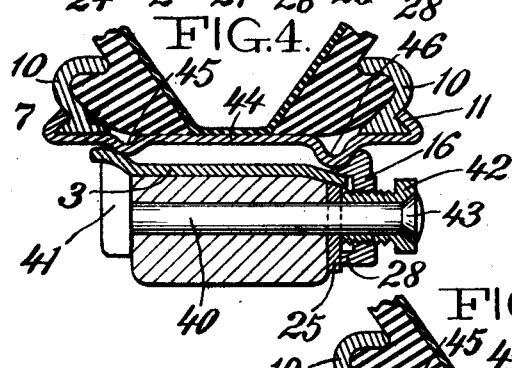
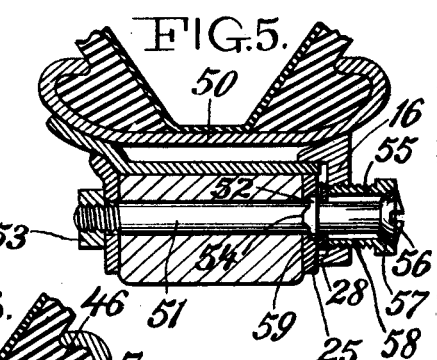
Attest:
Gerald E. Terwilliger
Edmund Quincy Moses
Inventor:
James H. Wagenhorst
by Seward Davis
his Atty.

J. H. WAGENHORST.
VEHICLE WHEEL RIM.
APPLICATION FILED AUG. 14, 1912.
1,085,773.
Patented Feb. 3, 1914.
2 SHEETS—SHEET 2.
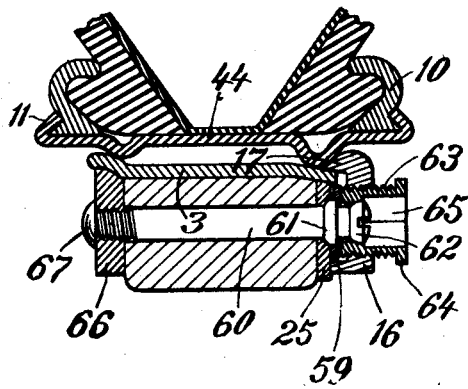
FIG.7.
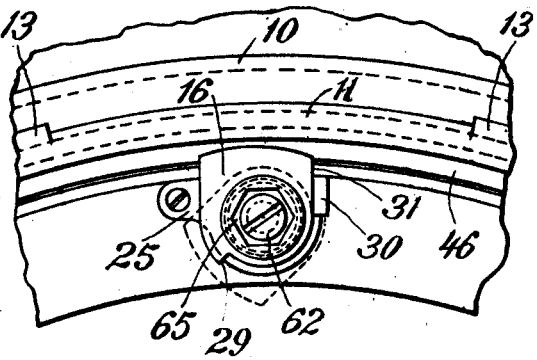
FIG.8.
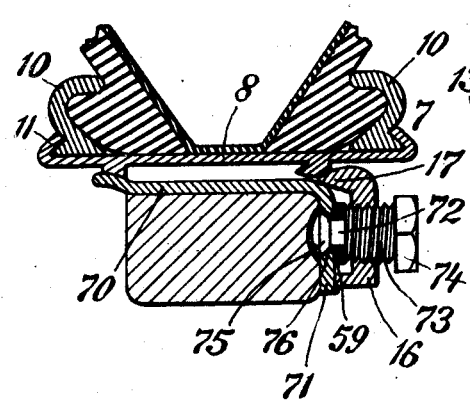
FIG.9.
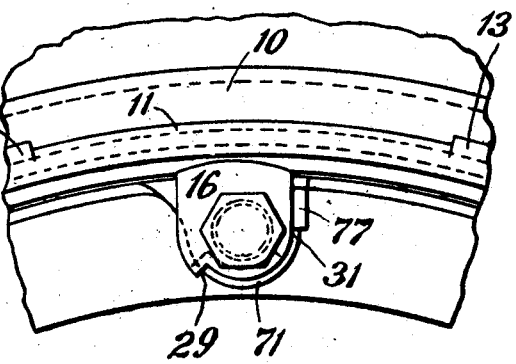
FIG.10.
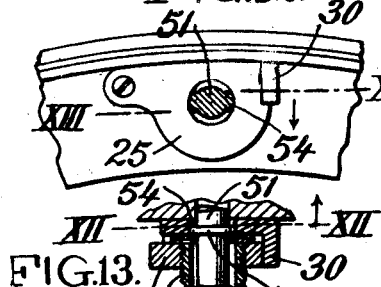
FIG.12.
FIG.13.
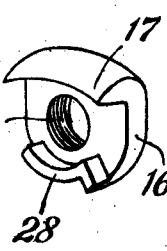
FIG.11.
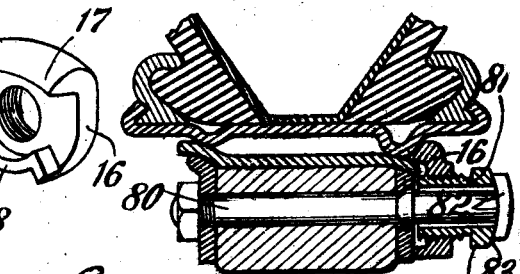
FIG.14.
Attest:
Gerald E. Terwilliger
Edmund Chin L. Moss
Inventor:
James H. Wagenhorst
by Seward Davis his Atty.

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE WHEEL-RIM.

1,085,773.   Specification of Letters Patent.   Patented Feb. 3, 1914.

Application filed August 14, 1912. Serial No. 714,989.

*To all whom it may concern:*

Be it known that I, JAMES H. WAGENHORST, a citizen of the United States, residing in the city of Akron, county of Summit, and State of Ohio, have invented certain new and useful Improvements in Vehicle Wheel-Rims, of which the following is a specification.

This invention relates to improvements in the class of rims known as demountable, in which a rim for holding a pneumatic or other resilient tire is removably mounted upon a vehicle wheel. In structures of this class the tire-carrying rim with the tire thereon may be removed and replaced by a duplicate rim carrying another tire. It is thus possible to make an exchange of tires without the necessity for detaching the resilient tire from the tire-carrying rim or placing the new one upon such rim, and in case of an accident while on the road a necessary change of tires is greatly facilitated. It is possible to carry extra tire-carrying rims with fully inflated pneumatic tires upon them, so that upon placing a new tire upon the wheel it is not even necessary to inflate the same.

In certain prior applications which I have filed, for example, my application Serial Number 639,953, filed July 22, 1911, I have described a tire-carrying rim comprising a rim base having removable tire-retaining flanges, the tire-retaining flanges being held upon the rim base by means of low inwardly hooked flanges formed integral with the rim base. The inwardly hooked flanges interlock with the tire-retaining flanges and thus support and strengthen the latter, and where the rim base is transversely split this interlocking engagement has the important function of preventing the collapse of the rim base before the removable rim is mounted upon the wheel. I have also described in certain of my applications a new way of securing a tire-carrying rim upon a wheel, consisting in distorting the rim slightly by forcing it away from the wheel at intervals so as to cause the rim to clamp the wheel between the points where it is lifted therefrom. Where a rim provided with the interlocking tire-retaining flanges is mounted upon a wheel in this manner it will be seen that the distortion of the rim base to clamp it upon the wheel necessitates also the distortion of the endless flanges to some extent at least.

In accordance with my present invention I make the flanges of the rim base interlock with the tire-retaining flanges only at intervals and adjacent to the points where the rim is to be forced away from the wheel, the rim base being permitted to draw away from the tire-retaining flanges between such points. Thus the distortion of the rim base to cause it to clamp the wheel is greatly facilitated and may be accomplished without producing any substantial distortion of the endless flanges.

My present invention also contemplates certain improvements in means for clamping the tire-carrying rim removably upon the wheel, the nature and objects of which will fully appear from the following detailed description.

In the accompanying drawings which form a part of this specification, Figure 1 is a side elevation of a portion of a vehicle wheel having one form of my improved demountable rim structure applied thereto; Fig. 2 is a transverse section on line II—II of Fig. 1; Fig. 3 is a similar section on line III—III of Fig. 1; Fig. 4 is a view similar to Fig. 2, illustrating a modified form of my invention; Fig. 5 is a similar view illustrating a modified form of locking device for securing a tire-carrying rim upon a wheel. In this figure the locking device is shown in connection with a tire-carrying rim of the ordinary one-piece clencher type, but it is obvious that the locking device of this figure may be utilized with other forms of tire-carrying rims, such as illustrated, for example, in Figs. 2 or 4; Fig. 6 is a view similar to Figs. 2 and 5, illustrating such a modification, in which a tire-carrying rim of the form shown in Fig. 4 is held upon the wheel by means of a locking device such as is shown in Fig. 5; Fig. 7 is a transverse section, and Fig. 8 a side elevation of a portion of a rim structure showing another modified form of locking device; Fig. 9 is a transverse section, and Fig. 10 a side elevation of a portion of a rim structure illustrating another modified form of locking device; Fig. 11 is a perspective view of a form of keeper; Fig. 12 is a side elevation of a portion of a wheel felly provided with a locking device of the form illustrated in Figs. 5 and 6, the bolt being shown in section. The position of the section is indicated by the line XII—XII in Fig. 13, the plate 25 and the parts integral therewith being shown in full for the sake of clearness. Fig. 13 is a section of the locking device taken in a plane indicated by the line XIII—XIII in Fig. 12; Fig. 14 is a transverse section through a wheel felly and rim illustrating a modified form of locking device.

Referring to the drawings in detail and particularly to Figs. 1, 2 and 3, the numeral 1 designates a vehicle wheel which may be of any suitable construction, but which is shown for purposes of illustration as an ordinary wooden artillery wheel having a wooden felly 2. Shrunk or otherwise secured upon the felly is a metallic felly band 3 having a flange 4 at one edge thereof, the outer surfaces of the flange forming a bearing surface 5. At the other side the felly band is preferably bent down slightly to provide a beveled bearing surface 6. 7 is the tire-carrying rim which comprises the rim base 8, which in the present instance is transversely split as indicated in Fig. 1 at 9, and the endless removable and reversible tire-retaining flanges 10. For holding the tire-retaining flanges upon the rim base, the latter is provided with an integral upturned flange at each edge thereof. Each of these flanges comprises sections 11 which are inwardly hooked so as to overhang and interlock with the dovetail-shaped bases 12 of the flanges 10, as shown in Fig. 2, and sections 13 which are not inwardly hooked and do not interlock with the bases of the flanges 10, but which simply hold such flanges against lateral displacement, as indicated in Fig. 3. The particular shape of the bases of the flanges 10 and the flange sections 11 is not important so long as the interlocking is secured, although I prefer the approximate shape illustrated in the drawings. The rim base 8 is provided with inwardly projecting ribs 14 and 15 which engage the bearing surfaces 5 and 6 on the felly band. The engaging faces of the rim and felly band at the two sides of the wheel being of different diameters, the application and removal of the tire-carrying rim is facilitated and the clearance necessary to permit such application and removal and to permit the valve stem to be "button-holed" through its opening in the felly is greatly reduced. This action is now well understood and I will not therefore describe the same in detail herein. For securing this tire-carrying rim upon the wheel I provide means for lifting the same away from the bearing surfaces of the felly band at intervals, thus causing the intermediate portions of the rim to grip such bearing surfaces and to seat firmly thereon throughout the greater portion of the circumference of the wheel. The means used for this purpose are preferably also such as positively to prevent lateral removal of the rim. The rim is lifted away from the wheel at points opposite to the inwardly hooked sections 11 of the side flanges of the rim base. The intermediate sections of the rim base, which are provided with the side flange sections 13, are forced into engagement with the bearing surfaces of the felly band, by the pressure of the air in the inflated tire. Thus the force of the air pressure coöperates with the wedges in clamping the rim upon the wheel, instead of tending to oppose the action of the wedges as would be the case were the flanges continuously hooked. As the flange sections 13 do not interlock with the endless tire-retaining flanges, it is possible for the rim base to draw away from the tire-retaining flanges, as shown in Fig. 3, and thus to seat upon the bearing surfaces of the felly band without also drawing in and thus distorting the endless tire-retaining flanges. The comparatively rigid endless flanges therefore afford no resistance to the distortion of the rim base and the action of clamping the rim base to the wheel is greatly facilitated. The devices for forcing the rim base away from the wheel may consist of radial bolts or studs, as shown in certain of my prior applications; for example, my applications Serial Numbers 668,771 and 672,544, or they may consist of wedges forced laterally between the felly band and rim base, as shown in Figs. 1 and 2, or they may be of any other construction adapted to accomplish the purpose.

In Figs. 1 and 2 I have shown as a means for securing the rim upon the wheel a plurality of keepers 16 having wedge portions 17 which are forced between the beveled bearing surface 6 on the felly band and seats 18 on the rim formed by bending in portions of the rib or flange 15. The keepers 16 have threaded openings 19 therethrough and screw upon the enlarged threaded ends 20 of bolts 21. The latter pass transversely through holes in the wheel felly and turn freely therein. They are secured in position in any suitable manner as by being screwed through nuts 22 and then having their ends riveted over as indicated at 23 to prevent them from unscrewing. The nuts 22 preferably bear against washers or plates 24 which also form bearings for the ends of the bolts. The other ends of the bolts pass through washers or plates 25 and may advantageously be provided with cone-shaped bearing surfaces 26 which fit conical holes in the plates 25. The bolts thus serve to hold the plates 25 against the side of the wheel felly, the plates being preferably further secured by means of screws. The bolts are provided with heads 27 by which they may be rotated. The keepers 16 are preferably provided with fulcruming flanges 28 along their lower edges, which bear against the plates 25, and also with shoulders 29 which engage lugs 30 bent up from the plates 25, these lugs serving to limit the rotary movement of the keepers 16 when the same are rotated to inoperative position. It will be seen that the rotation of the bolts 21 in one direction or the other will cause the keepers to be forced into wedging engagement between the wheel and rim or to be drawn out of said engagement and away from the side of the wheel felly. When the keepers are drawn away sufficiently to permit the points of the wedge portions 17 thereof to clear the edge of the felly band, a further rotation of the bolts 21 causes the keepers to be rotated therewith until the shoulders 29 engage the lugs 30. This will stop the rotation of the keepers which are now in inoperative position, as indicated in dotted lines in Fig. 8. With the keepers in this position the rim may be removed and replaced without interference, and after being replaced the bolts 21 are turned in the reverse direction, which will first cause the keepers to rotate into operative position, where they will be stopped by the engagement of their vertical sides 31 with the lugs 30. Further rotation of the bolts 21 will cause the keepers to travel toward the side of the wheel felly, the wedge portions engaging the seats 18 on the rim and forcing the rim laterally and also lifting the same away from the felly band. The forcing of the rim laterally will cause the rib 14 to ride up on the bearing surface 5 at the opposite side of the wheel and thus force this side of the rim away from the center of the wheel. The effect of this will be to draw the bearing surfaces of the ribs 14 and 15 into close contact with the bearing surfaces on the felly band between adjacent wedges, as shown in Figs. 1 and 3, and as already explained.

In Fig. 4 I have shown a modification of my invention in which the means for locking the rim upon the wheel comprise a number of bolts 40, each of which has a head 41 preferably formed integral therewith. Each of the bolts has a plain shank so that it may be passed through a hole in the felly, through a plate or washer 25 and through an externally threaded sleeve or nut 42 which carries the keeper 16. In assembling the device the bolt is passed through the felly, washer and sleeve, as described, and its end is then riveted over to form a head 43. The operation of this device is the same as that of the locking device shown in Fig. 2. Its merit lies principally in its simplicity and in the cheapness with which it may be constructed. In this figure the tire-carrying rim comprises a base 44 carrying the tire-retaining flanges, the base being similar to the base 8 shown in Figs. 2 and 3, except that instead of having flanges 14 and 15 hot-rolled thereon, it has ridges 45 and 46 rolled therein for a similar purpose. These ridges are formed without thickening the metal of the rim base, and the latter may accordingly be formed from flat stock. In other respects this modification of my invention is the same as that already described.

In Fig. 5 I have shown a modified form of locking device for holding the tire-carrying rim upon the wheel, the tire-carrying rim being shown in this instance for purposes of illustration as consisting of a one-piece metal channel 50 of the customary clencher rim cross-section. Each of the locking devices, of which any suitable number may be used, comprises a bolt 51 passing transversely through a hole in the felly and preferably having formed thereon a collar 52 which engages a plate or washer 25 and retains the same against one side of the wheel felly. The bolt is held in position by means of a nut 53. In order to prevent the rotation of the bolt when the nut 53 is screwed on, or when the sleeve 55 is rotated, the collar 52 is preferably formed with the tapered projections 54 which engage recesses formed in the washer. The collar itself is also preferably countersunk into the washer. These projections on the collar are illustrated in further detail in Figs. 12 and 13. The washer 25 is held from rotation in any suitable manner, as by means of the screw shown in Fig. 12. The bolt carries upon the portion thereof extending beyond the collar 52 an externally threaded sleeve 55 upon which screws the keeper 16. The sleeve 55 is retained upon the bolt by a head 56 formed at the end of the bolt, said head preferably having a spherical surface fitting a spherical socket 57 formed in the end of the sleeve 55. The opening in the sleeve through which the extension portion of the bolt passes is made of larger diameter than the bolt, as indicated at 58, so as to permit a limited movement of the sleeve upon the bolt, the spherical head of the bolt and the spherical socket formed in the end of the sleeve constituting a ball and socket joint. The opening through the sleeve is also preferably made of sufficient size to permit the sleeve to be passed over the collar 52 in assembling the device. It will be seen that the ball and socket mounting of the sleeve upon the end of the bolt permits the keeper, which is carried by the sleeve, to seat itself evenly in contact with the rim and wheel. Any tilting of the keeper which may result when the same is screwed up tightly will thus have no tendency to bend or shear the end of the bolt, but will be amply provided for by the movement of the sleeve upon the bolt. I preferably insert between the plate 25 and the inner end of the sleeve 55 a split spring washer 59 which acts to prevent the accidental rotation of the sleeve 55 and does not interfere with any movement of the sleeve upon the end of the bolt, which may occur.

In Fig. 6 I show a modification of my invention, in which the tire-carrying rim is of the same construction as that shown in Fig. 4. The locking device is the same as that shown in Fig. 5, except that the wedge portion of the keeper 16 is properly formed to engage a rim of the type shown. This figure shows the keeper rotated to inoperative position.

In Figs 7 and 8 I have shown another modification of my invention, in which the tire-carrying rim, which is of the same construction as that shown in Fig. 4, is held upon the felly band by means of a suitable number of locking devices, each of which comprises a bolt 60 having a collar 61 thereon which engages a plate 25 secured to one face of the felly, the other end of the bolt being screwed through a nut or plate 66 and its end riveted over as indicated at 67. The bolt 60 has a spherical-shaped head 62 similar to the head 56 of the bolt 51 shown in Fig. 5, but located much nearer the collar 61, as the extension portion of the bolt is short. The bolt-head 62 retains the externally threaded sleeve 63 upon which screws the keeper 16. The bolt, instead of being provided with a hexagonal head at its outer end, by which it may be rotated, carries simply a small flange 64, which prevents the keeper 16 from becoming detached from the sleeve. This flange need not have the width necessary for a head suitable for engagement by a wrench, and therefore the total length of the sleeve may be reduced. For rotating the sleeve a hexagonal or otherwise suitably shaped socket 65 is formed therein, in which a key may be inserted. A spring lock washer 59 may be inserted between the end of the sleeve and the plate 25, if desired. In this form of my invention it will be seen that the ball and socket joint formed by the spherical head of the bolt 60 and the spherical socket in the sleeve is located very near the side of the wheel felly and practically in the plane of the keeper 16. The maximum freedom of tilting of the keeper is thus permitted.

In Figs. 9 and 10 I have illustrated a modification of my invention in which I entirely dispense with the use of bolts passing through the felly. In accordance with this modification the felly band 70 has lugs 71 attached thereto or formed integral therewith and bent down alongside of the felly, these lugs carrying the locking devices. This general idea is illustrated in the patent to Shaw, No. 910,869, dated January 26, 1909. I have made certain improvements, however, in the structure of that patent. In accordance with my invention, each of the lugs 71 has a hole therein through which passes a stem 72 formed at the inner end of a screw-threaded stud 73. The latter is provided with a head 74 by which it may be rotated, or, as will be obvious, it may have a socket formed in its end as shown in Fig. 7, or be provided with other suitable means for rotating the same. A keeper 16, of suitable form, is screwed upon each of the studs 73. The end of the stem 72 is riveted over to form a head 75 which secures the stud to the lug 71. The opening through the lug is preferably formed into a spherical socket 76, the head 75 being spherically shaped so as to form a ball and socket joint and thus permit the stud and the keeper carried thereby to swing until the keeper finds a true bearing engagement with the rim and felly band. A spring washer 59 may advantageously be inserted between the lug 71 and the screw-threaded portion of the stud, this washer serving to prevent accidental rotation of the stud and also to maintain the same normally in position at right angles to the plane of the wheel and to prevent rattling. The washer will, however, yield sufficiently to permit the necessary movement of the stud when the keeper is finding its seat. Each lug 71 preferably has a lug 77 bent outward at one side thereof to form a stop for engagement with the shoulder 29 on the keeper 16, this lug 77 corresponding in function to the lug 30 formed upon the plate 25 above described. The point of pivotal connection of the stud 73 with the lug 71, being inside of the keeper, permits great freedom of movement of the stud and keeper and assures an even seating of the latter. By securing the entire locking devices to lugs permanently carried by the felly band, it will be seen that the felly band and locking devices may be furnished to a wheel maker completely assembled, and that all that it is necessary for the wheel maker to do is to shrink or otherwise secure the felly band upon the wheel, when the rim is complete. It avoids the necessity for the boring of accurately spaced holes through the felly of the wheel.

In Fig. 14 I show a modified form of locking device which comprises a bolt 80 carried by the wheel and having a projecting portion upon which is rotatably mounted a sleeve 81. This sleeve is externally threaded and carries a keeper 16 of the nature already described. The sleeve fits the projecting portion of the bolt loosely and is held thereon by a head or flange 82 on the end of the bolt. The inner surface of this flange and the outer surface 83 of the head 84 of the sleeve are made spherical. This form of my invention differs, however, from the forms shown in Figs. 5, 6, 7 and 8, in that in those forms the head of the bolt is convex and fits a concave socket in the sleeve or nut, while in the modification of Fig. 14, the end of the sleeve or nut is convex and the flange or head of the bolt is concave. This has the effect of throwing the center of oscillation of the sleeve toward the side of the wheel felly and substantially into the plane of the keeper, as in the form of my invention shown in Fig. 7. With this construction the maximum amount of oscillation of the sleeve upon the bolt for the difference in diameter between the inside of the sleeve and the bolt is obtained.

Having thus described certain preferred embodiments of my invention, but without desiring to limit myself to the details set forth any further than as specified in some of the more limited claims hereunto appended, and without intending to limit my invention to an apparatus in which all the features described are embodied, as certain features of my invention are capable of being advantageously employed without others, I claim:

1. The combination of a vehicle wheel, a tire-carrying rim comprising a rim base and a removable tire-retaining flange mounted thereon, said flange being interlocked with said rim base at intervals, and means for distorting said rim base to cause the same to clamp itself upon the wheel.

2. The combination of a vehicle wheel, a tire-carrying rim comprising a rim base having inwardly hooked flange portions located at intervals around the edges thereof, and separate tire-retaining flanges mounted upon said rim base and interlocking with said inwardly hooked flange portions, and means for forcing said rim base away from said wheel adjacent to said inwardly hooked flange portions, whereby the rim base is caused to clamp itself upon the wheel between the points where it is forced away from the latter.

3. The combination of a vehicle wheel, a tire-carrying rim comprising a transversely split rim base having an outwardly extending flange at each side thereof, portions of said flanges located at intervals about the circumference of the rim base being inwardly hooked, endless tire-retaining flanges mounted upon said rim base, said flanges having base portions interlocking beneath said inwardly hooked flange portions, and wedges carried by said wheel and adapted to be forced laterally between said wheel and rim base adjacent to the points of the rim base provided with the inwardly hooked flange portions, whereby the rim base is forced away from the wheel adjacent to said points and caused to clamp itself upon the wheel between successive wedges.

JAMES H. WAGENHORST.

Witnesses:
 KARL S. DEITZ,
 EDMUND QUINCY MOSES.